W. KLINE.
LAMINATED FABRIC.
APPLICATION FILED APR. 23, 1919.

1,341,987.

Patented June 1, 1920.

Inventor:
Walter Kline,
By
Attys.

UNITED STATES PATENT OFFICE.

WALTER KLINE, OF MOGADORE, OHIO.

LAMINATED FABRIC.

1,341,987. Specification of Letters Patent. Patented June 1, 1920.

Application filed April 23, 1919. Serial No. 292,048.

*To all whom it may concern:*

Be it known that I, WALTER KLINE, a citizen of the United States, residing at Mogadore, in the county of Summit and State of Ohio, have invented certain new and useful Improvements in Laminated Fabric, of which the following is a specification.

The present invention relates to a fabricated strip of material which is particularly adapted for use as a core in the manufacture of pneumatic tire casings, hose and belting.

One of the objects of the invention is to provide a strip of the character described, which will offer, when used in the manufacture of tire casings, a maximum resistance to puncture, bruise or separation of cords, and still retain a high degree of resiliency, as well as prolonged service. Aside from these advantages when used in the manufacture of tire casings, it also finds expression and offers a like number of advantages as a core in the manufacture of hose and belting.

The invention will be more readily understood upon reference to the accompanying drawing, in which—

Figure 1:
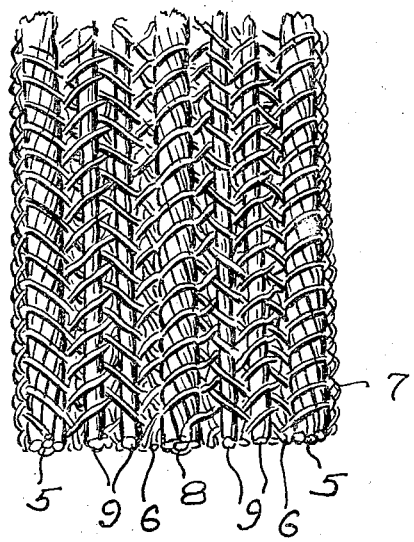
Figure 1 is a plan view of the strip, showing the weave as exaggerated.

Referring to the drawing in detail, I prefer to construct the strip of so-called cords, consisting of interwoven strands embedded in rubber or similar material, having beaded ends 5 connected by comparatively thin web portions 6. In their preferred form the beaded ends 5 consist primarily of a plurality of twisted cords formed to provide cable-like tension members. These tension members are woven in the strip in such a manner as to leave a frayed or selvaged edge 7. Woven in the web portion 6 are additional beads or tension members, providing a tension member 8 of substantially the same diameter as that of the members 5. This member 8 is produced in a like manner as the members 5, to wit, by providing a plurality of twisted cords. As the member 8 is woven in the web portion 6, midway between the beads or tension members 5, the web portion is practically divided to form a pair of web portions, one on each side of the intermediate tension member 8 and between it and each of the members 5. In each of these portions of the web is provided a pair of secondary tension members 9, of smaller diameter than either the members 5 or the member 8, and consisting of either a single cord or a plurality of twisted strands of cord.

Figure 2:
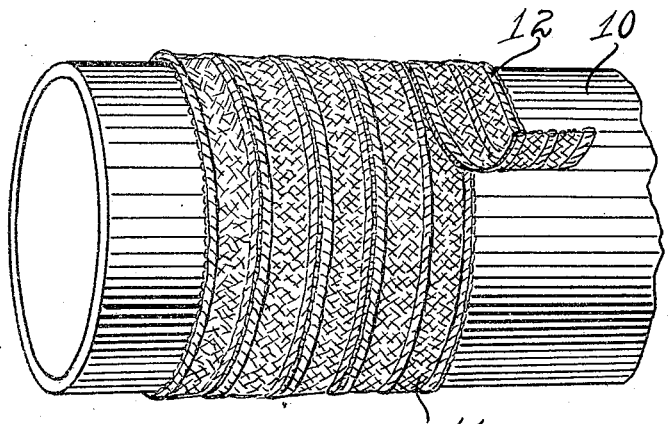
Fig. 2 is a view illustrating the application of the strip as used in the manufacture of tire casings and hose.

In carrying out the invention, so far as it concerns the manufacture of tire casings or hose, I prefer to employ the usual mandrel or core 10, on which is formed the inner sheathing 11 of the casing or hose. It is to be understood that the mandrel 10 in the manufacture of tire casings will be of the usual type, whereas in the manufacture of hose the mandrel will be of a slightly different form and will consist primarily of a construction such as shown. After the first sheathing 11 has been applied to the mandrel a second sheathing, such as 12, will be applied in substantially the same relation to the inner sheathing 11 as shown in Fig. 2, with its beaded edge abutting against the bead provided by the intermediate tension member 8, and with the beaded edge on the inner sheathing abutting against the bead provided by the intermediate tension member 8 on the outer sheathing. In the manufacture of tire casings I prefer to use still a third sheathing, which will be applied in diagonal relation to the sheathing 11 and the sheathing 12. It is to be noted that the inner and outer sheathings are interlocked by the arrangement of the tension members and beads provided thereby, which will firmly retain the strips in position and offer a maximum amount of resistance to separation. It is, of course, understood that the strips are suitably embedded in rubber or similar material, as is usual in the manufacture of tire casings and hose. The selvage edge 7 will offer an advantage in holding the rubber in which the strips are embedded.

In the manufacture of belting, as proposed by the application of my improved strip, I would suggest that the belting be produced in the same manner as in the manufacture of tire casings and hose, to wit, the strips should be interlocked and the belting used with the beads or tension members running longitudinally thereof, in order to take advantage of the tensile strengthening effect of the tension members. In actual practice the width of the web portion between the intermediate tension member and the tension members 5 will be substantially that of the width of one of the tension members 5. In other words, when the strips are interlocked the space between the intermediate tension member and one of the members 5 on one strip will be completely taken up by the beaded edge of the interlocking strip.

I claim:

1. In a tape of the character described, having a thickened portion adjacent the edges thereof, a central portion of equal thickness therewith, said portions being spaced apart by a web, and longitudinal tensile cords carried within said web.

2. In a tape of the character described, having a thickened portion adjacent the edges thereof, a central portion of equal thickness therewith, said portions being spaced apart by a web, and longitudinal tensile cords carried within said web and lying parallel to said thickened portions.

3. In a tape of the character described, having a thickened portion adjacent the edges thereof, a central portion of equal thickness therewith, said portions being spaced apart by a web, longitudinal tensile cords carried within said web and lying parallel to said thickened portions, and a selvage edge.

WALTER KLINE.